US012771781B2

(12) United States Patent
Layman et al.

(10) Patent No.: US 12,771,781 B2
(45) Date of Patent: Oct. 20, 2026

(54) SYSTEMS FOR CALL MONITORING AND ASSOCIATED METHODS USING CALL ARRIVAL INTERVALS

(71) Applicant: AVOXI, INC., Atlanta, GA (US)

(72) Inventors: Randy Layman, Marietta, GA (US); Scott Strong, Ithaca, NY (US); Keith Meyers, Senoia, GA (US); Alexander Hunt, Bainbridge Island, WA (US); Mitchell Ramsey, Lake Wylie, SC (US); Matt Nichols, Roswell, GA (US); Jeffery Wayne Cook, Eagle Mountain, UT (US)

(73) Assignee: AVOXI, INC., Atlanta, GA (US)

( * ) Notice: Subject to any disclaimer, the term of this patent is extended or adjusted under 35 U.S.C. 154(b) by 197 days.

(21) Appl. No.: 18/922,563

(22) Filed: Oct. 22, 2024

(65) Prior Publication Data

US 2026/0113401 A1 Apr. 23, 2026

(51) Int. Cl.
*H04M 3/22* (2006.01)
*H04M 3/32* (2006.01)

(52) U.S. Cl.
CPC ....... *H04M 3/2272* (2013.01); *H04M 3/2281* (2013.01); *H04M 3/323* (2013.01); *H04M 2203/551* (2013.01); *H04M 2250/60* (2013.01)

(58) Field of Classification Search
None
See application file for complete search history.

(56) References Cited

U.S. PATENT DOCUMENTS

| | | | | |
|---|---|---|---|---|
| 8,535,059 | B1 * | 9/2013 | Noble, Jr. | G09B 7/02 379/265.06 |
| 8,605,869 | B1 | 12/2013 | Mobarak et al. | |
| 10,791,221 | B1 * | 9/2020 | Vislocky | H04M 3/5116 |
| 2005/0129213 | A1 * | 6/2005 | Parker | H04M 3/51 379/265.03 |

FOREIGN PATENT DOCUMENTS

| | | |
|---|---|---|
| JP | 2012205291 | 10/2012 |
| JP | 2012205291 A * | 10/2012 |

OTHER PUBLICATIONS

English Translation of JP 2012205291A (Year: 2012).*
European Search Report for European Patent Application No. 25207664.1 mailed Feb. 5, 2026.
Poisson Distribution. Wikipedia. Retrieved Sep. 4, 2024 from: https://en.wikipedia.org/wiki/Poisson_distribution.

* cited by examiner

*Primary Examiner* — Quoc D Tran
(74) *Attorney, Agent, or Firm* — Carlson, Gaskey & Olds, P.C.

(57) ABSTRACT

The disclosed systems may be utilized for call monitoring, including determining whether a callee may be experiencing an outage based on an expected call arrival interval. Methods of call monitoring are also disclosed.

20 Claims, 3 Drawing Sheets

FIG.3
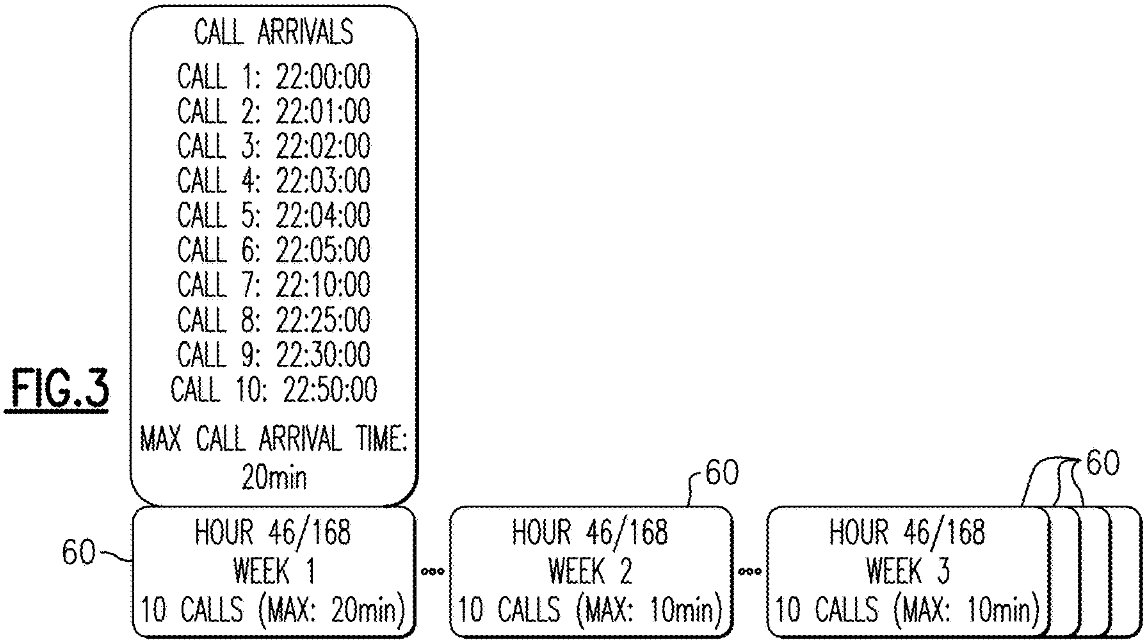
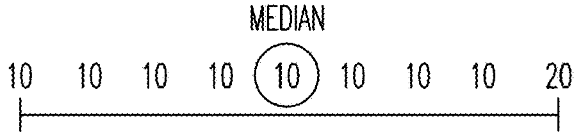
FIG.4
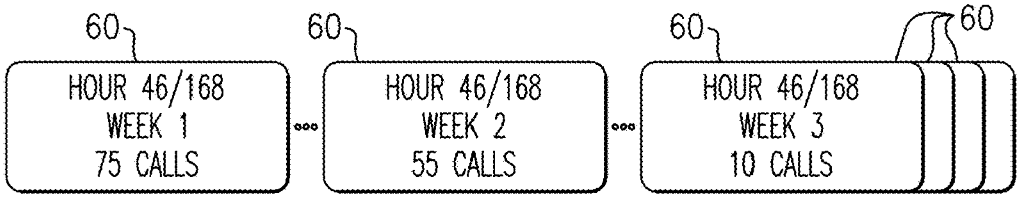
FIG.5
FIG.6
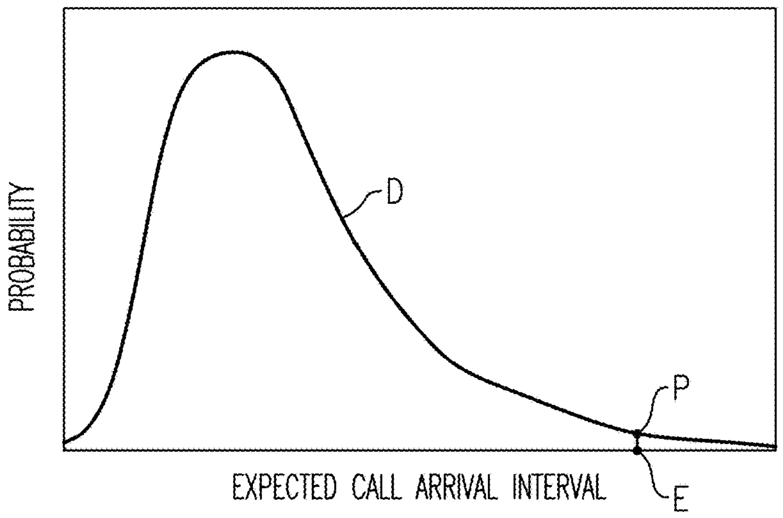

SYSTEMS FOR CALL MONITORING AND ASSOCIATED METHODS USING CALL ARRIVAL INTERVALS

BACKGROUND

This disclosure relates to (e.g., telephone) communications systems, including techniques for call monitoring.

Telephone networks may involve many different entities (e.g., companies) to connect a caller and callee. Businesses depend on their phones working to support their existing customers, sell to new customers, and communicate with the broader world while doing business. Previously working phone numbers may stop functioning due to changes with a network and/or associated devices.

SUMMARY

Implementations of the systems and/or methods disclosed herein may be utilized to monitor incoming calls based on call arrival intervals.

A communications system according to an implementation may include one or more processors coupled to memory. The one or more processors may be collectively operable to execute a communications environment. The communications environment may be operable to establish an expected call arrival interval associated with one or more prior received incoming calls to a callee telephone number. The communications environment may be operable to determine an arrival of an incoming call to the callee telephone number. The communications environment may be operable to determine whether a subsequent incoming call to the callee telephone number arrives prior to expiration of a timer associated with the expected call arrival interval. The communications environment may be operable to generate an alert in response to determining that no subsequent incoming call to the callee telephone number has arrived prior to the expiration.

A method of call monitoring according to an implementation may include establishing an expected call arrival interval associated with one or more prior received incoming calls to a callee telephone number. The method may include determining an arrival of an incoming call to the callee telephone number. The method may include determining whether a subsequent incoming call to the callee telephone number arrives prior to expiration of a timer associated with the expected call arrival interval. The method may include performing a diagnostics action in response to determining that no subsequent incoming call to the callee telephone number has arrived prior to the expiration.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 discloses a set of call arrival times for a time interval and a maximum call arrival time according to an implementation.

FIG. 4 discloses a median of maximum call arrival times associated with a set of time intervals according to an implementation.

FIG. 5 discloses call rates associated with respective time intervals according to an implementation.

FIG. 6 discloses a distribution associated with expected call arrival intervals based on a call rate according to an implementation.

Like reference numbers and designations in the various drawings indicate like elements.

DETAILED DESCRIPTION

Figure 1:
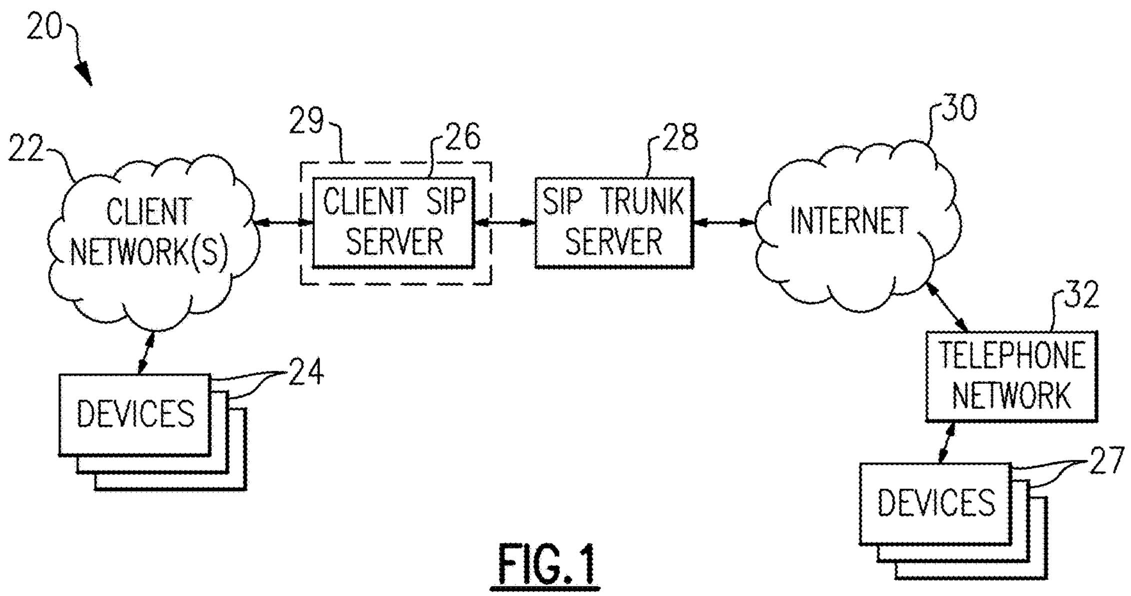
FIG. 1 discloses a communications system.

The disclosed systems and methods may be utilized for call monitoring, including determining whether a callee may be experiencing an outage based on an expected call arrival interval (e.g., expectation).

A communications (e.g., telephone) system (e.g., network) may be assigned (e.g., allocated) a set of telephone numbers, which may be utilized by one or more communications (e.g., telephone) devices to place a telephone call. The telephone devices may be associated with a respective communications (e.g., client or customer) network. The system may be operable to interconnect the client network and one or more other telephone networks, which may be associated with one or more telephone devices. The system may be operable to establish the connection utilizing various techniques, including voice over internet protocol (VoIP). The network and/or associated devices may experience an outage. Previously working phone numbers assigned to the network may stop functioning due to configuration changes, upgrades, component failure, or regulatory changes.

The disclosed systems and methods may establish one or more expected call arrival intervals for callee telephone numbers based on a history of call arrival intervals associated with prior received calls. The disclosed systems and methods may detect when calls are not arriving to the callee and may cause one or more diagnostics actions to be performed. The diagnostics actions may include active test(s) to confirm an outage and/or generating alert(s) to repair a communications path. Timely detection and repair of issues may improve functioning of communications for businesses and other users.

A communications system according to an implementation may include one or more processors coupled to memory. The one or more processors may be collectively operable to execute a communications environment. The communications environment may be operable to establish an expected call arrival interval associated with one or more prior received incoming calls to a callee telephone number. The communications environment may be operable to determine an arrival of an incoming call to the callee telephone number. The communications environment may be operable to determine whether a subsequent incoming call to the callee telephone number arrives prior to expiration of a timer associated with the expected call arrival interval. The communications environment may be operable to generate an alert in response to determining that no subsequent incoming call to the callee telephone number has arrived prior to the expiration.

In any implementations, the communications environment may be operable to place a diagnostics call to the callee telephone number in response to determining that no subsequent incoming call to the callee telephone number has arrived prior to the expiration.

In any implementations, a Session Initiation Protocol (SIP) server may include the one or more processors.

In any implementations, the incoming call may be associated with a communications path between a first device associated with a caller and a second device associated with the callee telephone number. The communications environment may be operable to determine the expected call arrival interval and the arrival of the incoming call corresponding to an intermediate location along the communications path.

In any implementations, the communications environment may be operable to query a list of prior call records for any prior received calls to the callee telephone number. The communications environment may be operable to filter the prior received calls based on one or more preselected criterion. The communications environment may be operable to establish the expected call arrival interval based on the filtered prior received calls.

In any implementations, the one or more preselected criterion may include the respective prior received call occurring during a set of preselected time intervals.

In any implementations, the set of preselected time intervals may be associated with a common hour, common range of hours, and/or a common day of the week.

In any implementations, the communications environment may be operable to determine, for each preselected time interval, respective inter-call arrival times between any prior received calls to the callee telephone number. The communications environment may be operable to determine, for each preselected time interval, a representative inter-call arrival time associated with the determined inter-call arrival times. The communications environment may be operable to determine the expected call arrival interval based on the representative inter-call arrival times.

In any implementations, the communications environment may be operable to determine, for each of the preselected time intervals, a volume of any prior received calls to the callee telephone number. The communications environment may be operable to expand the preselected time intervals from a first duration to a second, larger duration in response to determining that the volume associated with one or more of the preselected time intervals is below a first preselected volume threshold. The communications environment may be operable to shrink the preselected time intervals from the first duration to a third, smaller duration in response to determining that the volume associated with one or more of the preselected time intervals is above a second preselected volume threshold.

In any implementations, the communications environment may be operable to select, for each of the preselected time intervals, a maximum of the determined inter-call arrival times to be the representative inter-call arrival. The communications environment may be operable to determine the expected call arrival interval to be a median or an average of the maximums of the preselected time intervals.

In any implementations, the communications environment may be operable to determine, for the set of preselected time intervals, a call rate of any prior received calls to the callee telephone number. The communications environment may be operable to determine, for the set of preselected time intervals, a percentile based on a volume of any prior received calls to the callee telephone number. The communications environment may be operable to determine the expected call arrival interval based on a Poisson distribution associated with the determined percentile.

In any implementations, a duration of the timer may include the expected call arrival interval.

In any implementations, the duration of the timer may include a buffer. The buffer may be a product of the expected call arrival interval and a preselected buffer coefficient.

A method of call monitoring according to an implementation may include establishing an expected call arrival interval associated with one or more prior received calls to a callee telephone number. The method may include determining an arrival of an incoming call to the callee telephone number. The method may include determining whether a subsequent incoming call to the callee telephone number arrives prior to expiration of a timer associated with the expected call arrival interval. The method may include performing a diagnostics action in response to determining that no subsequent incoming call to the callee telephone number has arrived prior to the expiration.

In any implementations, the step of performing the diagnostics action may include generating an alert associated with a potential outage in a communications path to a computing device associated with the callee telephone number. The step of performing the diagnostics action may include placing a diagnostics call to the callee telephone number.

In any implementations, the step of determining the arrival of the incoming call may occur at an intermediate location in a communications path between a first device associated with a caller and a second device associated with the callee telephone number. The expected call arrival interval may correspond to the intermediate location.

In any implementations, the step of performing the diagnostics action may be performed by a Session Initiation Protocol (SIP) server that may be adapted to interconnect a first device associated with a caller initiating the incoming call and a second device associated with the callee telephone number.

In any implementations, the step of establishing the expected call arrival interval may include establishing a set of expected call arrival intervals associated with respective sets of preselected time intervals. The method may include setting a duration of the timer based on a time of the arrival of the incoming call associated with the respective set of preselected time intervals.

In any implementations, the step of establishing the expected call arrival interval may include querying a list of prior call records for any prior received calls to the callee telephone number during a set of preselected time intervals. The step of establishing the expected call arrival interval may include determining, for each of the preselected time intervals, respective inter-call arrival times between any prior received calls to the callee telephone number. The step of establishing the expected call arrival interval may include determining the expected call arrival interval based on the inter-call arrival times.

The step of establishing the expected call arrival interval may include querying a list of prior call records for any prior received calls to the callee telephone number during a set of preselected time intervals. The step of establishing the expected call arrival interval may include determining, for the set of preselected time intervals, a call rate of any prior received calls to the callee telephone number. The step of establishing the expected call arrival interval may include determining, for the set of preselected time intervals, a percentile based on a volume of any prior received calls to the callee telephone number. The step of establishing the expected call arrival interval may include determining the expected call arrival interval based on a Poisson distribution associated with the determined percentile.

FIG. 1 discloses a (e.g., telephone) communications system 20 according to an implementation. The system 20 may include one or more (e.g., client or customer) networks 22. The system 20 may be operable to connect one or more computing (e.g., telephone, communications or client) devices 24 of the respective network 22 with various devices of the system 20. The computing devices 24 may include one or more VoIP phones, laptops, desktops, etc. The client network 22 may be established by one or more networking devices, such as servers, routers, switches, etc.

The system 20 may include one or more Session Initiation Protocol (SIP) servers. The SIP servers may include one or more (e.g., client) SIP servers 26 and/or one or more (e.g., host) SIP trunk servers 28. The client server 26 and/or trunk server 28 may be operable to establish one or more SIP trunks 29. The SIP trunk server 28 may include a session border controller (SBC), SIP gateway, etc. The SIP trunk server 28 may be linked to, or may otherwise have access to, a telephone network 32. The telephone network 32 may include known equipment to facilitate calls in a known manner. The telephone network 32 may be operable to connect one or more computing (e.g., telephone, communications or client) devices 27 with various devices of the system 20. The computing devices 27 may include any of the devices disclosed herein, such as one or more VoIP phones, laptops, desktops, etc. The devices 24, 27 may be assigned to respective (e.g., end) users. The user may interact with the device 24/27 directly and/or remotely. The devices 24, 27 may be operable to initiate, receive and/or conduct (e.g., incoming and/or outgoing) phone calls, including between each other.

The telephone network 32 may support one or more phone numbers. The SIP trunk server 28 may be operable to interconnect the client server 26 and the telephone network 32 via the internet 30. The host server 28 may be remote from the SIP trunk 29. The client server 26 may be operable to interconnect the trunk 29 and the telephone network 32. For every incoming or outgoing phone call across the trunk 29, one SIP channel may be established. The SIP channel may support one or more calls conducted at different times. Each call may include an audio stream having two or more channels. The audio stream may be established in response to a first user (e.g., callee) answering the incoming call from the respective device 24/27, which may be initiated by a second user (e.g., caller) from another respective device 24/27. The trunk 29 may be operable to interconnect one or more of the devices 24, 27 to each other. The trunk 29 may be operable to establish a respective SIP channel for phone calls between the devices 24, 27.

Figure 2:
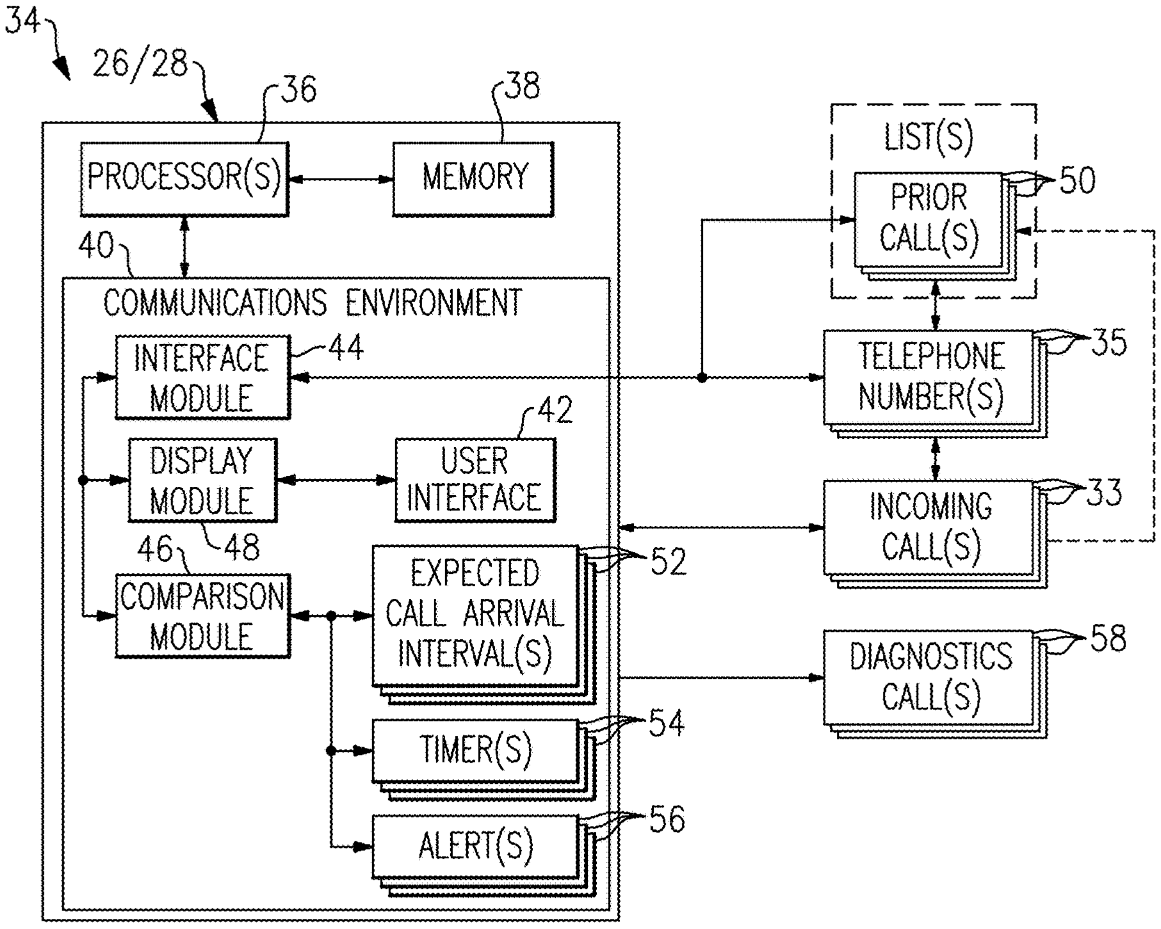
FIG. 2 discloses a system for call monitoring.

Referring to FIG. 2, with continuing reference to FIG. 1, a (e.g., communications) system 34 for call monitoring is disclosed. The system 34 may be incorporated into or may otherwise interface with the system 20. The system 34 may be incorporated into any of the devices of the system 20, such as the client server 26 and/or the trunk server 28. The system 34 may be operable to establish VoIP communications across the SIP trunk 29.

The system 34 may include one or more computing (e.g., communications) devices. Each computing device may include one or more computer processors, memory, storage means, network devices, input and/or output devices, and/or interfaces. The computing devices may be operable to execute one or more software programs, including the functionality of this description. The computing devices may be operable to communicate with one or more networks established by one or more computing devices. The memory may include UVPROM, EEPROM, FLASH, RAM, ROM, DVD, CD, a hard drive, or other computer readable medium which may store data and/or the functionality of this description. The computing devices may be a desktop computer, laptop computer, smart phone, tablet, or any other computer device. Input devices may include a keyboard, mouse, touchscreen, etc. The output devices may include a monitor, speakers, printers, etc. Each of the computing devices may include one or more processors coupled to memory. The computing devices may be coupled to each other by connection(s). The connection may be a wired and/or wireless connection. The connection may be established over one or more networks and/or other computing systems.

The system 34 may be operable to monitor incoming and/or outgoing calls associated with one or more telephone numbers 35. The telephone numbers 35 may be associated with one or more of the computing devices 24. Incoming calls 33 may be initiated by various devices of the system 20, such as the computing devices 27.

The system 34 may include one or more processors 36 coupled to memory 38. In implementations, a SIP server may include the processor(s) 36, such as the client SIP server 26 and/or SIP trunk server 28. The processor(s) 36 may be collectively operable to execute a communications environment 40. The communications environment 40 may be operable to execute any of the functionality disclosed herein.

The communications environment 40 may be executable on a single computing device or may be distributed between two or more computing devices. The communications environment 40 may be executable on the trunk server 28 and/or client server 26. In implementations, portions of the communications environment 40 may be distributed between the trunk server 28 and client server 26. In implementations, the trunk server 28 may be operable to execute the communications environment 40. The client server 26 may be operable to interact with the communications environment 40 through a thin-client or web browser.

The system 34 may include a (e.g., graphical) user interface 42 operable to display various information regarding one or more phone calls. A user may interact with the user interface 42 to configure one or more parameters associated with the communications environment 40 and/or view the information.

The communications environment 40 and/or another portion of the system 20 may be operable to assign telephone numbers 35 to one or more of the respective computing devices 24. The communications environment 40 may be operable to access one or more (e.g., call data) records associated with prior incoming (e.g., received) and/or outgoing (e.g., successful) call(s) 50 associated with the telephone numbers 35. The prior calls 50 may include all call attempts, regardless of whether the associated callee telephone number(s) 35 were working or not. The records may be call data records (CDR) including information about phone calls and/or network events, such as time, duration, completion status, source (e.g., caller) phone number, and/or destination (e.g., callee) phone number. The records may include one or more collected (e.g., received) calls 50. The records may be stored in, or may otherwise be associated with, one or more databases. The prior received calls may include calls successfully made (e.g., completed) to the respective callee phone number. The prior received calls may include calls that went through but may not be answered by the callee.

The communications environment 40 may include an interface module 44, a comparison module 46 and/or a display module 48. Although three modules are disclosed, fewer or more than three modules may be utilized to provide the disclosed functionality, including only one module. The display module 48 may be operable to cause the user interface 42 to display various information, including any of the information disclosed herein.

The interface module 44 may be operable to access data associated with telephone calls established across a communications system, such as the system 20. The interface module 46 may be operable to access information associated with one or more telephone numbers 35. The information may be stored in memory 38 and/or another (e.g., external) memory location. The interface module 46 may be operable to access information associated with one or more telephone calls between various devices of the system 20, including incoming and/or outgoing calls between the devices 24, 27.

The interface module 44 and/or another portion of the communications environment 40 may be operable to establish communications path(s) between the various devices of the system 20, including the computing devices 24, 27. Each communications path may include one or more hardware and/or software layers, which may be associated with one or more configurations (e.g., settings, software applications, etc.). The communications path(s) may be established by the SIP trunk(s) 29.

The comparison module 46 and/or another portion of the communications environment 40 may be operable to establish one or more expected call arrival intervals (e.g., expectations) 52 associated with one or more of the telephone numbers 35. The expected call arrival intervals 52 may be the same or may differ from each other. The comparison module 46 may be operable to store the expected call arrival intervals 52 in one or more databases and/or in another memory location. The comparison module 46 may be operable to obtain (e.g., reference) the stored expected call arrival intervals 52 when determining whether a device associated with the callee phone number 35 may be experiencing an outage. For the purposes of this disclosure, the term "call arrival interval" means an amount of time between two successive calls arriving at the same point. The arrival may be associated with a point-to-point handshake between the caller and callee (and/or intermediary) devices (and between all intermediate points along the associated communications path). The intermediate device may be operable to interconnect the caller and callee devices. For high frequency (e.g. usage) numbers the call arrival interval may be a second or less. For low frequency numbers the call arrival interval may be day(s) or month(s). The point of arrival may be at various locations of the system 20, such as a device associated with a callee or the SIP server 26/28.

The expected call arrival intervals 52 may be established utilizing various techniques, including any of the techniques disclosed herein. Each expected call arrival interval 52 may be associated with (e.g., calculated from) one or more prior received calls 64 to the respective callee telephone number 35.

The interface module 44 may be operable to monitor incoming calls 33 from caller(s) to callee(s), such as from the device(s) 27 to the device(s) 24 and/or vice versa. The interface module 44 may be operable to store and/or access information associated with prior received calls 50 to the (e.g., callee) telephone numbers 35. The information associated with the prior calls 50 may be stored in one or more prior call records. The prior call records may include any prior received (e.g., collected) calls 50 to the telephone numbers 35. The prior call records may be associated with one or more lists. The interface module 44 may be operable to query the list(s).

The comparison module 46 may be operable to determine arrival of incoming call(s) to the callee telephone number(s) 35, which may be associated with respective device(s) 24. The comparison module 46 may be operable to determine the expected call arrival interval 52 associated with the incoming call 33.

The incoming call 33 may be associated with a communications path between a first device associated with a caller and a second device associated with the callee telephone number 35. The first device may be one of the devices 27 associated with the telephone network 32. The second computing device may be one of the devices 24 associated with the network 22. The communications environment 40 may be operable to determine the expected call arrival interval 52 and/or the arrival of the incoming call 33 corresponding to one or more locations along the communications path, including an intermediate location and/or the device associated with the callee telephone number 35. The intermediate location may be associated with one of the SIP servers 26, 28.

Each telephone number 35 may be associated with one or more expected call arrival intervals 52. The expected call arrival interval 52 associated with the respective incoming call 33 may be selected from a set of expected call arrival intervals 52 based on one or more predefined criterion. The comparison module 46 may be operable to (e.g., iteratively) update the set of expected call arrival intervals 52 based on the occurrence of subsequent prior calls 50 and/or passage of time.

The comparison module 46 may be operable to set one or more timers 54 associated with respective incoming calls 33 to the respective telephone number 35. The timer 54 may be associated with the successful arrival of a most recent incoming call 33 to the respective callee telephone number 35. A duration of the timer 54 may be associated with the expected call arrival interval 52 assigned to the incoming call 33. A duration of the timer 54 may include the expected call arrival interval 52. The duration of the timer 54 may be equal to the expected call arrival interval 52.

A duration of the timer 54 may be greater than, or may otherwise differ from, the expected call arrival interval 52. In implementations, the duration of the timer 54 may include the expected call arrival interval 52 and a buffer. A buffer coefficient may be applied to the expected call arrival interval 52 when calculating the duration, which may provide additional time between when a subsequent call may be expected and when it may likely exceed the expectation (e.g., taking into account variability, etc.). In implementations, the buffer may be a product of the expected call arrival interval and the preselected buffer coefficient. The buffer coefficient may be a multiple (e.g., 0.2×, 1×, 2×, etc.), which may be applied to the expected call arrival interval 52. The comparison module 46 may be operable to determine whether a subsequent incoming call 33 to the respective callee telephone number 35 may arrive prior to expiration of the timer 54. The buffer may reduce a likelihood of incorrectly determining that an outage may have occurred.

The expected call arrival intervals 52 may be utilized to determine whether a computing device 24 associated with the assigned callee telephone number 35 may be experiencing an outage. The comparison module 46 may be operable to cause one or more diagnostics actions to be performed to determine and/or correct an outage. The comparison module 46 may be operable to generate one or more alerts 56 in response to determining that no subsequent incoming calls 33 to the callee telephone number 35 have arrived prior to expiration of the respective timer 54. The comparison module 46 may be operable to cause the communications environment 40 and/or another portion of the system 34 to place one or more diagnostics (e.g., test) calls 58 to the callee number 35 in response to determining that no subsequent incoming calls 33 to the callee number 35 have arrived prior to expiration of the respective timer 54.

Various techniques may be utilized to establish the expected call arrival interval(s) 52. The comparison module 46 may be operable to query one or more lists (e.g., databases or logs) of prior call records for any prior received calls 50 to the callee number 35. The prior call activity may be limited by various criterion. The comparison module 46 may be operable to filter the prior received calls 50 based on one or more preselected criterion, including any of the criterion disclosed herein. The comparison module 46 may be operable to establish the expected call arrival interval 52 based on the filtered prior received calls 50. The preselected criterion may include the respective prior incoming call(s) 50 occurring during a set of preselected time intervals (e.g., buckets) associated with a preselected (e.g., trailing) time period (e.g., window). The time period may include a group of recurring sets of time intervals (e.g., multiple instances of the sets of time periods). The time period may have various durations (e.g., 9 weeks), which may be associated with a sufficient history incoming call volume. The preselected duration may be associated with a duration (e.g., immediately) prior to the most recent prior call 50 to the callee phone number 35. In implementations, the set of preselected time intervals may be associated with a common hour, a common range of hours, and/or a common day of the week. The time intervals within each set may be associated with different weeks and/or months within the preselected time period.

The comparison module 46 may be operable to determine, for each preselected time interval, respective inter-call arrival times between any prior received calls 50 to the callee number 35. The comparison module 46 may be operable to determine, for each preselected time interval, a representative inter-call arrival time associated with the determined inter-call arrival times. The comparison module 46 may be operable to determine the expected call arrival interval 52 based on the representative inter-call arrival times.

The comparison module 46 may be operable to select, for each of the preselected time intervals, a maximum of the determined inter-call arrival times to be the representative inter-call arrival. The comparison module 46 may be operable to determine the expected call arrival interval 52 to be a median or an average of the maximums of the representative inter-call arrivals.

FIGS. 3-4 disclose an implementation of determining an expected call arrival interval 52. A history of prior call(s) 50 for a phone number 35 from the last (e.g., nine) weeks may be obtained from a database storing a set of call records. For each call, a call arrival interval may be calculated. A preselected time period (e.g., 9 weeks) may be divided into groups (e.g., weeks) and may be sub-divided into sets of preselected time intervals 60 (e.g., hours and/or days of the week). The prior calls 50 may be sorted into the set(s) of time intervals 60 for the respective phone number(s) 35. The time intervals 60 may be associated with the week of data (e.g., 1-9), day of the week (e.g., 1-7), and/or hour of the day (e.g., 1-24). In implementations, 1512 (e.g., 9 weeks×7 days×24 hours) time intervals 60 may be established for the time period. For each hour of the week for the historical 9 weeks, the comparison module 46 may calculate an expected inter-call arrival time 52 and/or a proxy of it (e.g., a rate of calls in that time interval).

Various statistical techniques may be utilized to calculate the expected call arrival interval 52. An implementation may include establishing the expected call arrival interval 52 based on a median of maximums over a historical set of prior calls 50. For each of the 1512 time intervals within the time period, a maximum inter-call arrival time may be selected (e.g., FIG. 3). For each day of the week and each hour of the day (e.g., 9 data points within a 9 week time period), a median value may be determined (e.g., FIG. 4). The expected call arrival interval 52 for the phone number 35 may be set to the median value for that day of the week and hour of the day (e.g., 168 total expectations for a time period of 9 weeks).

Other statistical techniques for calculating the expected call arrival interval(s) 52 may include a maximum of medians, average of maximums, maximum of averages, and/or average. A maximum of medians may include determining a median of the inter-call arrival times for each respective set of time intervals, and then determining the expected call arrival interval 52 based on a maximum of the median values across the preselected time period. An average of the maximums may include determining a maximum of the inter-call arrival times for each respective set of time intervals, and then determining the expected call arrival interval 52 based on an average of the maximum values across the preselected time period. The average may be calculated based on the inter-call arrival times for all prior received call 50 to the callee phone number 35 within the preselected time period (e.g., every call during a 9 week period).

Other techniques may be utilized to calculate the expected call arrival interval(s) 52. A distribution of the prior call history may be established for each respective phone number 35. Various distributions may be utilized in accordance with the teachings disclosed herein, such as a Poisson, log-normal and/or gamma distribution. The comparison module 46 may be operable to determine, for the set of preselected time intervals, a call rate of any prior received calls 50 to the callee telephone number 35. The comparison module 46 may be operable to determine, for the set of preselected time intervals, a percentile based on a volume of any prior received calls 50 to the callee telephone number 35. The comparison module 46 may be operable to determine the expected call arrival interval 52 based on a Poisson distribution associated with the determined percentile. A lower (e.g., $90^{th}$) percentile may be associated with an expected call arrival interval 52 having a lesser duration than an expected call arrival interval 52 associated with a relatively higher (e.g., $99^{th}$) percentile. A lesser duration may facilitate relatively quicker detection of an outage, whereas a greater duration may reduce a likelihood of falsely identifying an outage.

FIGS. 5-6 disclose an implementation of determining an expected call arrival interval 52, which may be associated with a Poisson distribution. The prior (e.g., historical or collected) calls 50 may be sorted into a set of preselected time intervals 60 by week of data (e.g., 1-9), day of the week (e.g., 1-7), and/or hour of the day (e.g., 1-24) (e.g., FIG. 5). A volume (e.g., rate) of prior calls 50 to the callee phone number 35 may be calculated for each day of the week and each hour of the day (168 points) for the historical (e.g., 9) weeks. An exponential distribution D for the expected call arrival interval or the hour of the week may be established based on the calculated rate (e.g., FIG. 6). A percentile P along the distribution D and associated expected call arrival interval E may be selected based on the volume of prior calls 50 (e.g., FIG. 6).

Some phone numbers 35 may lack a sufficient volume to establish a prediction of when a subsequent incoming call to the callee phone number 35 should arrive. The disclosed techniques may be utilized with relatively low call volume, which may account for intervals that may be prone to low accuracy and/or may have relatively long intervals between calls. The sample of prior calls 50 to the callee phone number 35 may be increased (e.g., expanded) and/or decreased (e.g., shrunk) to calculate the call rate and/or expected call arrival interval 52.

The preselected time intervals may be increased in duration based on one or more preselected criterion, such as prior call volume. The comparison module 46 may be operable to determine the expected call arrival interval 52 based on a (e.g., sufficient) volume of prior received calls 50 to the callee telephone number 35. The comparison module 46 may be operable to determine, for each of the preselected time intervals, the volume of any prior received calls 50 to the callee telephone number 35. The volume may be compared to one or more preselected volume thresholds, such as a first (e.g., minimum) preselected volume threshold and/or a second (e.g., maximum) preselected volume threshold. The first volume threshold may be a minimum number of calls per time interval (e.g., 10 calls). The second volume threshold may be a higher (e.g., maximum) number of calls per time interval (e.g., 50 calls). The first volume threshold may be selected to ensure there is sufficient historical data to make (e.g., reasonable) inferences about the prior call arrival interval(s). The second volume threshold may be selected to establish one or more reduced duration time interval(s) when the historical data may include a relatively high call volume, which may result in higher accuracy in determining the expected call arrival interval(s) based on relatively more representative set(s) of prior calls. The preselected time intervals may be expanded to meet the first preselected volume threshold and/or shrunk to be below the second preselected volume threshold. Each time interval may be expanded to include one or more adjacent time intervals. The comparison module 46 may be operable to increase (e.g., expand) the preselected time intervals from a first duration (e.g., 1 hour) to a second, larger duration (e.g., 2 or 3 hours) in response to determining that the volume associated with one or more of the respective time intervals is below the first preselected volume threshold. The comparison module 46 may be operable to reduce (e.g., shrink) the preselected time intervals from the first duration (e.g., 1 hour) to a third, lesser duration (e.g., 30 minutes) in response to determining that the volume associated with one or more of the respective time intervals is above the second preselected volume threshold. The time intervals with the same set may have the same duration, including for any time intervals that may be expanded.

The individual time intervals may be expanded to include multiple consecutive (e.g., previous) hours. In an implementation, Monday at 6-7 am may have a relatively low call volume; therefore, the time interval may be expanded to include data from Monday at 5-6 am (e.g., Monday at 5-7 am in total). The time interval may be continued to be expanded until there is a sufficient number of prior calls 50 to meet the preselected volume threshold. In another implementation, the same hour for different days of the week may be utilized (e.g., if Monday 6 am has insufficient volume, then expand to include Sunday 6 am and/or Tuesday 6 am). In another implementation, Monday at 6-7 am may have a relatively high call volume; therefore, the time interval may be shrunk to establish two or more reduced time intervals (e.g., Monday at 6-6:30 am and 6:31 am-7 am).

Figure 7:
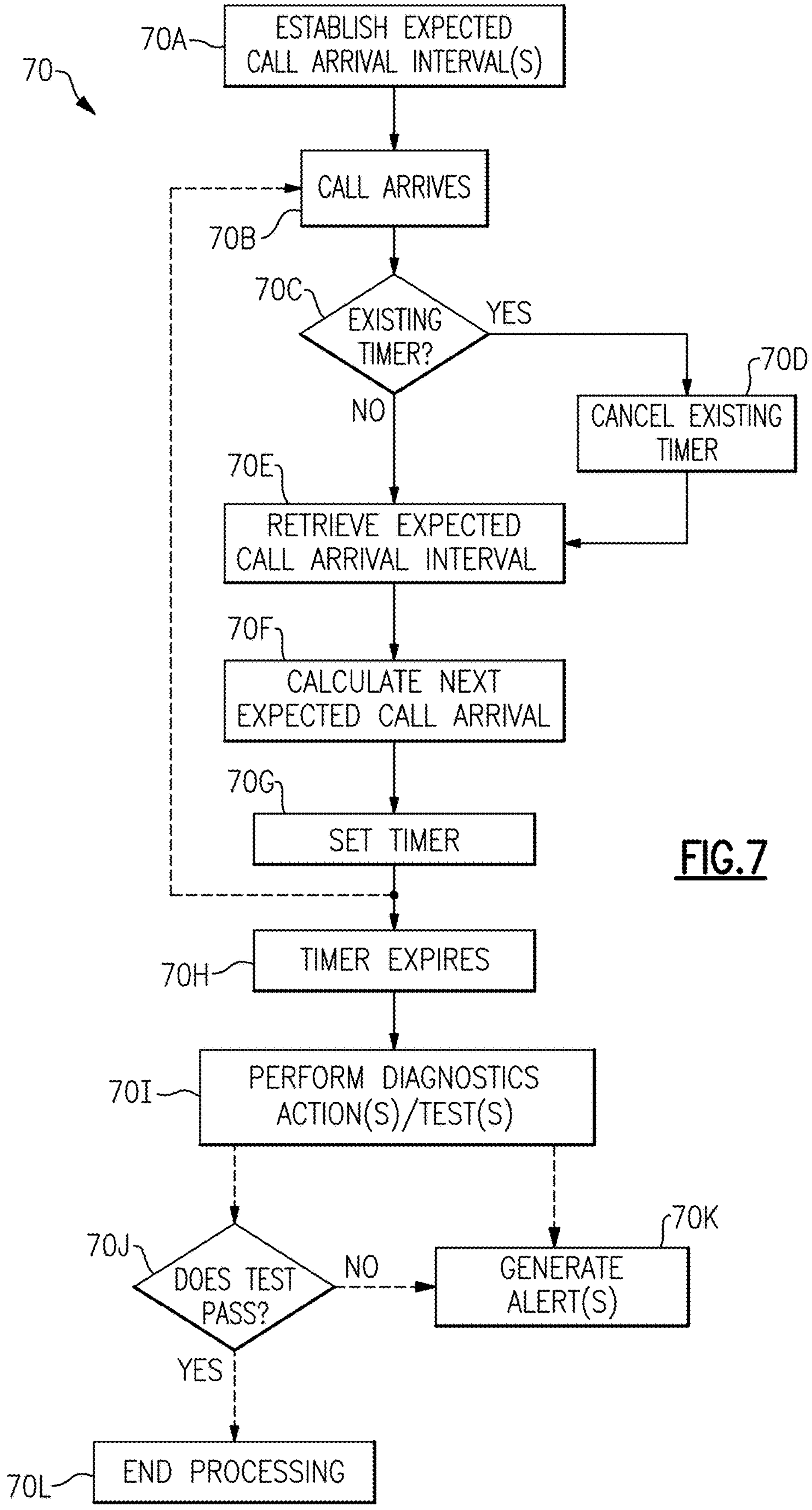
FIG. 7 discloses a method of call monitoring according to an implementation.

FIG. 7 discloses a method of call monitoring in a flow chart 70 according to an implementation. The method 70 may be utilized to determine whether one or more callees may be experiencing an outage based on an associated expected call arrival interval relative to arrival of a (e.g., most recent) incoming call to the callee. The method 70 may determine the expected call arrival interval(s) utilizing any of the techniques disclosed herein. The expected call arrival interval(s) may be established based on one or more previously received calls to the respective callee telephone number(s). The expected call arrival interval(s) may be the same or may differ for a set of telephone numbers. Fewer or additional steps than are recited below could be performed within the scope of this disclosure, and the recited order of steps is not intended to limit this disclosure. The communications environment 40 may be programmed with logic for performing method 70. Reference is made to the systems 20, 34.

At block 70A, one or more expected call arrival intervals 52 may be established. The expected call arrival interval 52 may be established utilizing any of the techniques disclosed herein. The expected call arrival interval 52 may be associated with one or more prior received calls 50 to a callee telephone number 35. Block 70A may include establishing a set of expected call arrival intervals 52 associated with respective sets of preselected time intervals (e.g., buckets) within a preselected time period (e.g., window).

The expected call arrival interval 52 may be established utilizing any of the statistical techniques disclosed herein. Establishing the expected call arrival interval 52 may include querying a list of prior call records for any prior (e.g., historical or collected) received calls 50 to the callee telephone number 35 during the set of preselected time intervals. Establishing the expected call arrival interval 52 may include determining, for each of the preselected time intervals, respective inter-call arrival times between any prior received calls 50 to the callee number 35 (e.g., FIG. 3). The expected call arrival interval 52 may be determined based on the inter-call arrival times.

Other techniques for establishing the expected call arrival interval 52 may include selecting the expected call arrival interval 52 based on a distribution of the prior received calls 50 to the callee phone number 35. Various distributions may be utilized in accordance with the teachings disclosed herein, including any of the distributions disclosed herein such as a Poisson distribution. A percentile may be selected for the respective distribution. The expected call arrival interval 52 may be associated with the selected percentile.

The percentile selected to represent the expected call arrival interval 52 may be static and/or may be relatively high (e.g., 90th, 99th, etc.). The percentile selected for the expected call arrival interval 52 may be selected based on historical call volume. The percentiles selected for the respective expected call arrival intervals 52 may be the same or may differ from each other, including with respect to a single callee number 35 and/or two or more callee numbers 35.

Establishing the expected call arrival interval 52 may include querying a list of prior call records for any prior received calls 50 to the callee number 35 during a set of preselected time intervals. Establishing the expected call arrival interval 52 may include determining, for the set of preselected time intervals, a call rate of any prior received calls 50 to the callee number 35 (e.g., FIG. 5). Establishing the expected call arrival interval 52 may include determining (e.g., selecting), for the set of preselected time intervals, a percentile based on a volume of any prior received calls 50 to the callee telephone number 35. Establishing the expected call arrival interval 52 may include determining the expected call arrival interval 52 based on a Poisson distribution associated with the determined percentile (e.g., FIG. 6).

The percentile selected may be dynamic based on call volume, which may be based on an inverse relationship. The percentile may be selected based on the following formula:

Percentile selected=1−1/(aggregate call volume for time interval)

The time interval may be any interval disclosed herein, such as hour(s) of the week. In an implementation, a relatively low (e.g., $90^{th}$) percentile on the distribution may be selected for a callee phone number 35 associated with a relatively low call volume (e.g., 10 total calls over the historical hour of the week). The percentile may be selected to reflect relatively lower confidence in the phone number 35 receiving a call within the call expected arrival interval 52. A relatively higher (e.g., $99^{th}$) percentile on the distribution may be selected for a number 35 having a relatively higher call volume (e.g., 10,000 total calls over the historical hour of the week).

At block 70B, an arrival of an incoming call 33 to the callee telephone number 35 may be determined. The arrival may occur at any of the locations along an associated communications path disclosed herein, such as at the SIP server 26/28 or a computing device 24 associated with the callee telephone number 35. The SIP server 26/28 may be adapted to interconnect a first device associated with a caller initiating the incoming call (e.g., device 27) and a second device associated with the callee telephone number 35 (e.g., device 24). Determining the arrival of the incoming call 33 may occur at an end point and/or intermediate location in a communications path between a first device associated with a caller (e.g., device 27) and a second device associated with the callee telephone number 35 (e.g., device 24). In implementations, the expected call arrival interval 52 may correspond to the end point (e.g., device 24). In other implementations, the expected call arrival interval 52 may correspond to the intermediate location (e.g., SIP server 26/28). Utilizing the techniques disclosed herein, a potential outage in the communications path between the intermediate location and end point may be determined.

At block 70C, a determination may be made whether a (e.g., running) timer 54 exists for the respective callee telephone number 35. The existing timer 54 may be cancelled (e.g., reset) at block 70D. Otherwise, a timer 54 may be initiated in response to the arrival of the incoming call 33.

At block 70E, the expected call arrival interval 52 for the respective callee telephone number 35 may be obtained (e.g., retrieved). In implementations, establishing the expected call arrival interval 52 at the block 70A may be incorporated into block 70E. The time of the incoming call 33 may be determined. The expected call arrival interval 52 associated with the preselected time interval (e.g., bucket) that is common with the time of the incoming call 33 may be selected (e.g., same hour(s), range of minutes and/or hours, and/or day(s) of the week). In implementations, when a new incoming call 33 arrives, the expected arrival interval 52 may be selected based on the call phone number 35 and associated time, such as the day of the week and/or hour of the day.

At block 70F, the next expected call arrival for the callee telephone number 35 may be determined (e.g., calculated). The next expected call arrival may equal to, or may otherwise include, a time of arrival of the incoming call 33 and a duration of the expected call arrival interval 52. In implementations, the duration of the expected call arrival interval 52 may include a buffer. The buffer may be a product of the expected call arrival interval and a preselected buffer coefficient.

At block 70G, the timer 54 may be set. The timer 54 may be set to expire at the next expected call arrival. Setting a duration of the timer 54 may be based on a time of the arrival of the incoming call 35 associated with the respective set of preselected time intervals for the preselected (e.g., historical) time period.

Method 70 may include determining whether a subsequent incoming call 33 to the callee number 35 arrives prior to expiration of the timer 54 associated with the expected call arrival interval 52. In a scenario, a subsequent incoming call 33 may arrive prior to the expiration of the timer 54 at block 70H. The timer 54 may be cancelled (e.g., reset) at block 70D. If an incoming call 33 to the callee phone number 35 arrives before the existing timer 54 expires, then the timer 54 may be cancelled and the method 70 may continue with setting a new timer 54. In another scenario, a subsequent incoming call 33 may not arrive prior to the expiration of the timer 54 at block 70H, which may be due to an outage associated with the callee telephone number 35.

At block 70I, one or more diagnostics actions may be performed. The diagnostics action(s) may be performed in response to determining that no subsequent incoming call 33 to the callee telephone number 35 has arrived prior to the expiration of the timer 54 at block 70H. In implementations, the diagnostics action(s) may be performed by the SIP server 26/28.

Various diagnostics actions may be performed. The diagnostics actions may include generating one or more alerts 56 at block 70K. The alert(s) 56 may be associated with a potential outage in a communications path to a computing device associated with the callee telephone number 35, such as one of the devices 24 of the network 22. The alert(s) 56 may be communicated to various portions of the system 20. In implementations, the alert(s) 56 may be displayed in the user interface 54. A user may perform one or more diagnostics actions in response to the alert(s) 56.

The diagnostics actions may include performing one or more diagnostics tests. The diagnostics tests may include performing an active test to confirm an outage, such as placing one or more diagnostics calls to the callee telephone number 35. At block 70J, a determination may be made whether the diagnostics test is successful (e.g., passed). If the diagnostics test is successful, then the diagnostics action(s) may be closed (e.g., end processing) at block 70L. A new iteration of the method 70 may be commenced for the callee number 35. Otherwise, one or more alerts 56 may be generated at block 70K. Generating the alert may including opening a ticket for investigation. The investigation may include additional diagnostics actions and/or manual intervention.

The disclosed systems and methods may be useful in improving detection of outages based on expected call arrival intervals associated with incoming calls. Diagnostics actions may be performed more quickly, which may lead to higher efficiency for intended recipients of incoming calls.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A communications system comprising:

one or more processors coupled to memory, wherein the one or more processors are collectively operable to execute a communications environment, and the communications environment is operable to:

establish an expected call arrival interval associated with one or more prior received calls to a callee telephone number;

determine an arrival of an incoming call to the callee telephone number;

determine whether a subsequent incoming call to the callee telephone number arrives prior to expiration of a timer associated with the expected call arrival interval; and generate an alert in response to determining that no subsequent incoming call to the callee telephone number has arrived prior to the expiration.

2. The system as recited in claim 1, wherein the communications environment is operable to:

place a diagnostics call to the callee telephone number in response to determining that no subsequent incoming call to the callee telephone number has arrived prior to the expiration.

3. The system as recited in claim 1, further comprising:

a Session Initiation Protocol (SIP) server comprising the one or more processors.

4. The system as recited in claim 1, wherein:

the incoming call is associated with a communications path between a first device associated with a caller and a second device associated with the callee telephone number; and the communications environment is operable to determine the expected call arrival interval and the arrival of the incoming call corresponding to an intermediate location along the communications path.

5. The system as recited in claim 1, wherein the communications environment is operable to:

query a list of prior call records for any prior received calls to the callee telephone number;

filter the prior received calls based on one or more preselected criterion; and establish the expected call arrival interval based on the filtered prior received calls.

6. The system as recited in claim 5, wherein:

the one or more preselected criterion include the respective prior received call occurring during a set of preselected time intervals.

7. The system as recited in claim 6, wherein:

the set of preselected time intervals are associated with a common hour, a common range of hours, and/or a common day of the week.

8. The system as recited in claim 6, wherein the communications environment is operable to:

determine, for each preselected time interval, respective inter-call arrival times between any prior received calls to the callee telephone number;

determine, for each preselected time interval, a representative inter-call arrival time associated with the determined inter-call arrival times; and determine the expected call arrival interval based on the representative inter-call arrival times.

9. The system as recited in claim 8, wherein:

the communications environment is operable to determine, for each of the preselected time intervals, a volume of any prior received calls to the callee telephone number; and the communications environment is operable to:

expand the preselected time intervals from a first duration to a second, larger duration in response to determining that the volume associated with one or more of the preselected time intervals is below a first preselected volume threshold; and/or shrink the preselected time intervals from the first duration to a third, smaller duration in response to determining that the volume associated with one or more of the preselected time intervals is above a second preselected volume threshold.

10. The system as recited in claim 8, wherein the communications environment is operable to:

select, for each of the preselected time intervals, a maximum of the determined inter-call arrival times to be the representative inter-call arrival; and determine the expected call arrival interval to be a median or an average of the maximums of the preselected time intervals.

11. The system as recited in claim 6, wherein the communications environment is operable to:

determine, for the set of preselected time intervals, a call rate of any prior received calls to the callee telephone number;

determine, for the set of preselected time intervals, a percentile based on a volume of any prior received calls to the callee telephone number; and determine the expected call arrival interval based on a Poisson distribution associated with the determined percentile.

12. The system as recited in claim 1, wherein:

a duration of the timer includes the expected call arrival interval.

13. The system as recited in claim 12, wherein:

the duration of the timer includes a buffer, and the buffer is a product of the expected call arrival interval and a preselected buffer coefficient.

14. A method of call monitoring comprising:

establishing an expected call arrival interval associated with one or more prior received calls to a callee telephone number;

determining an arrival of an incoming call to the callee telephone number;

determining whether a subsequent incoming call to the callee telephone number arrives prior to expiration of a timer associated with the expected call arrival interval; and performing a diagnostics action in response to determining that no subsequent incoming call to the callee telephone number has arrived prior to the expiration.

15. The method as recited in claim 14, wherein the step of performing the diagnostics action comprises:

generating an alert associated with a potential outage in a communications path to a computing device associated with the callee telephone number; and/or placing a diagnostics call to the callee telephone number.

16. The method as recited in claim 14, wherein:

the step of determining the arrival of the incoming call occurs at an intermediate location in a communications path between a first device associated with a caller and a second device associated with the callee telephone number; and the expected call arrival interval corresponds to the intermediate location.

17. The method as recited in claim 14, wherein:

the step of performing the diagnostics action is performed by a Session Initiation Protocol (SIP) server adapted to interconnect a first device associated with a caller initiating the incoming call and a second device associated with the callee telephone number.

18. The method as recited in claim 14, wherein the step of establishing the expected call arrival interval includes establishing a set of expected call arrival intervals associated with respective sets of preselected time intervals, and further comprising:

setting a duration of the timer based on a time of the arrival of the incoming call associated with the respective set of preselected time intervals.

19. The method as recited in claim 14, wherein the step of establishing the expected call arrival interval comprises:

querying a list of prior call records for any prior received calls to the callee telephone number during a set of preselected time intervals;

determining, for each of the preselected time intervals, respective inter-call arrival times between any prior received calls to the callee telephone number; and determining the expected call arrival interval based on the inter-call arrival times.

20. The method as recited in claim 14, wherein the step of establishing the expected call arrival interval comprises:

querying a list of prior call records for any prior received calls to the callee telephone number during a set of preselected time intervals;

determining, for the set of preselected time intervals, a call rate of any prior received calls to the callee telephone number;

determining, for the set of preselected time intervals, a percentile based on a volume of any prior received calls to the callee telephone number; and determining the expected call arrival interval based on a Poisson distribution associated with the determined percentile.

* * * * *